PATTERN CONTOUR TRACING APPARATUS UTILIZING PULSATING LIGHT SOURCE

Filed May 19, 1965

INVENTORS
Francis G. Bardwell
Derek H. Redman
By William J. Newman
Attorney

INVENTORS
Francis G. Bardwell
Derek H. Redman

By William J. Newman
Attorney

INVENTORS.
Francis G. Bardwell
Derek H. Redman

By William J. Newman

Attorney

United States Patent Office 3,423,589

Patented Jan. 21, 1969

3,423,589

PATTERN CONTOUR TRACING APPARATUS UTILIZING PULSATING LIGHT SOURCE

Francis G. Bardwell, Chicago, Ill., and Derek H. Redman, Kenley, England, assignors to Stewart-Warner Corporation, Chicago, Ill., a corporation of Virginia Filed May 19, 1965, Ser. No. 457,098

U.S. Cl. 250—202 15 Claims

Int. Cl. H01j 39/00

ABSTRACT OF THE DISCLOSURE

Pattern contour tracing apparatus of the type in which a pulsating light source illuminates the line or edge to be traced the image of which falls on photosensitive means comprising a plurality of photocells such as the photovoltaic type. The photocells are arranged in circuits for algebraically combining their outputs so as to provide resultant signals indicative of the deviation of the sensing head from the line or edge being traced. The resultant signals are used to control motive means such as phase sensitive servo motors so as to drive the equipment along the line or edge. Offline or edge apparatus is included to determine when the sensing head strays from the pattern.

This invention relates to position indicating devices and to pattern contour tracing systems such as are useful to control the operation of milling machines, torch cutters, welding tools, wood cutting machines, clothes cutters, and the like. More particularly, this invention relates to unique scanning techniques for position indicating and pattern contour tracing in which the pattern is scanned by a modulated light source and photosensitive means produce an output of the modulating frequency which is indicative of the position of the pattern with respect to a reference.

The earliest automatic pattern tracers were generally of the edge tracing type in which photosensitive means provided a substantially DC output, the level of which indicated the position of the scanner with respect to the pattern edge. Although these systems found widespread use in industrial applications, there were many problems because of inaccuracies relating to varying light intensities, DC amplifier drifting, non-uniform photosensitive devices and the like.

To overcome the difficulties found in the DC type edge tracers line tracers have been developed which provide fluctuating outputs whose characteristics are indicative of the position of the pattern with respect to a reference. These travers generally used some type of physically moving means which scanned the pattern line in an oscillatory manner to provide a signal having pulses which occur every time the scan encounters the line. These physical moving means included rotating mirrors, lenses or prisms, vibrating photocells, and opaque shades or shutters.

The advance of automation in industry as well as the advance of machine tools has brought about a demand for pattern tracing systems which can follow along a pattern contour at higher rates of speed than were possible with the above mentioned types. The physically moving scanner types present great problems in high speed tracing in view of the mass inertia of the parts making up the scanner.

The present invention overcomes the foregoing problems by employing a pattern contour scanner which utilizes a modulated light source. The pattern contour is illuminated by a light source which is pulsed at a predetermined frequency based on the speed of tracing and the degree of accuracy desired. Photosensitive means are positioned in the tracer to view the image of the contour and produced output signals in accordance therewith. In a preferred embodiments of the invention, to be hereinafter described, photovoltaic cells of the silicon solar chip type are used to generate electric signals responsive to the light intensity of the image cast thereon. The output of the photosensitive means are combined in a manner to provide resultant signals which are indicative of the direction and amount of deviation of the pattern contour from a reference.

The basic principles of modulated light scanning are applicable to both edge tracing and line tracing techniques. Therefore, systems directed to both types of tracing are described in the following specification.

It is an object of this invention to provide a unique device for indicating the displacement between a pattern or indicator and a reference utilizing modulated light scanning.

It is also an object of this invention to provide position indicators, pattern tracing systems and scanners therefor using unique modulated light scanning techniques.

It is another object of this invention to provide pattern contour tracing systems utilizing modulating light scanning which are capable of tracing at higher speeds than previous systems.

A further object of this invention is to provide position indicators, pattern contour tracing systems and scanners therefor using modulated light scanning techniques which have a high degree of accuracy but are relatively simple and more economical in construction than previous types.

Other objects and advantages of this invention will be readily apparent from a more detailed description of this invention, especially when taken in view of the accompanying drawings in which:

FIG. 1 is a vertical section view of a scanning head showing the illuminating, optical and photosensitive means therein for scanning a pattern contour;

FIG. 1*a* is a plan view of a simple photosensitive device;

FIG. 1*b* is a side view of the photosensitive device of FIG. 1*a*, taken along the line 1*b*—1*b* of FIG. 1*a*;

FIG. 1*c* is a schematic representation of the sensitive areas of the photosensitive device in FIG. 1*a* as they view the pattern contour;

FIG. 1*d* is a graphical representation of the outputs of the photosensitive means plotted against transverse deviations of the center of scan from the pattern contour;

Figure 4:
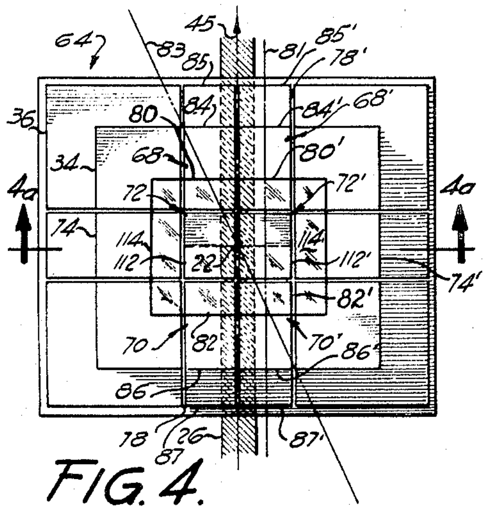
FIG. 4 is a plan view of one embodiment of a photovoltaic sensing means for use in a line tracing scanner.
Figure 6:
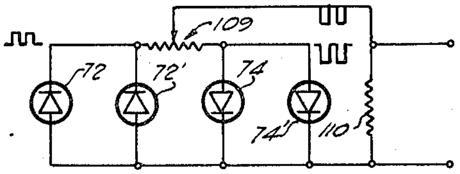
Figure 4A:
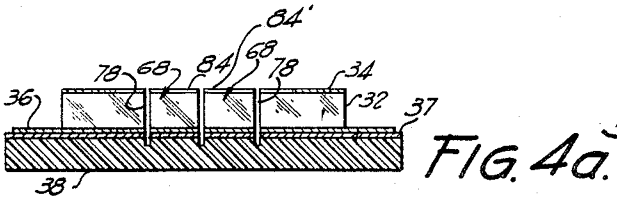
Figure 5:
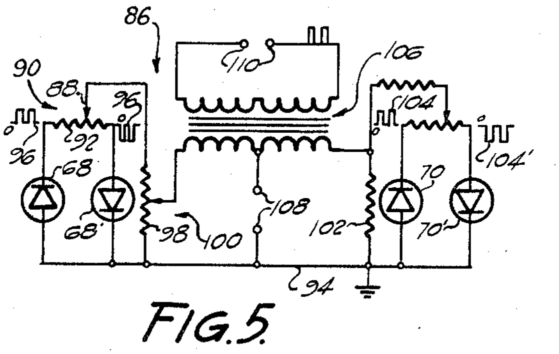
Figure 11:
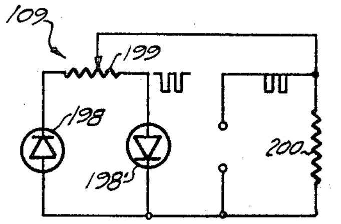
Figures 8, 9, 10:
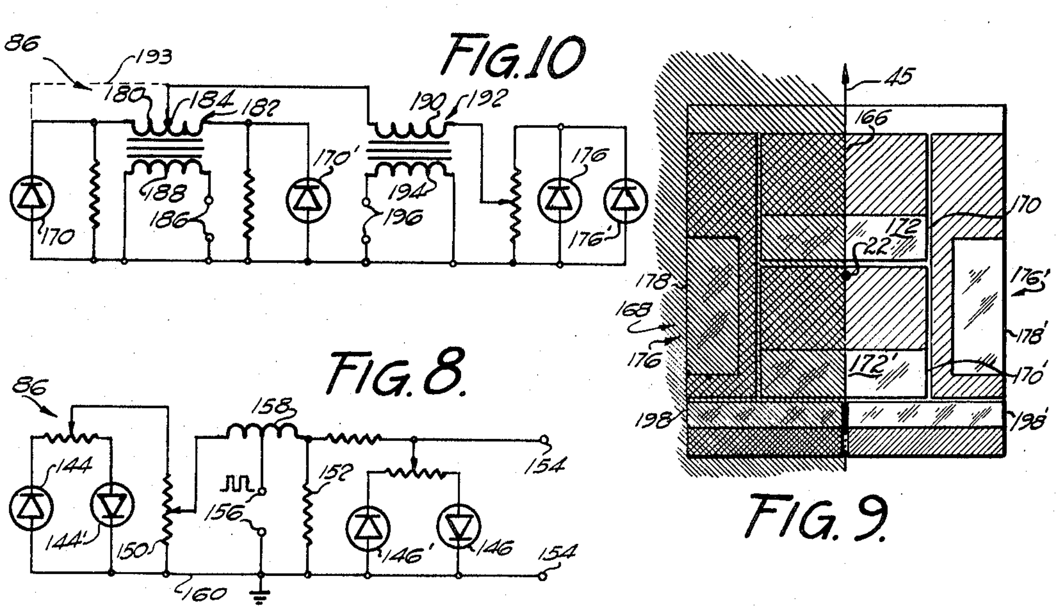
Figure 7:
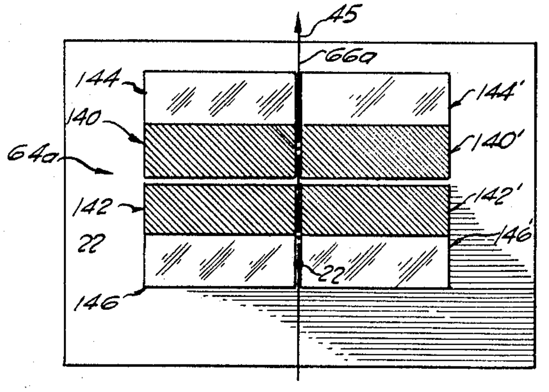

FIG. 4*a* is a section view of the sensing means of FIG. 4 taken along the line 4*a*—4*a* showing the construction thereof;

FIG. 5 is a schematic diagram of the circuit for combining the signal outputs of various sections of the sensing means shown in FIG. 4 to provide signals indicative of the position of the sensing means with respect to the pattern contour;

FIG. 6 is a schematic diagram of an offline indicating circuit to be utilized with the sensing means of FIG. 4;

FIG. 7 is a plan view of another embodiment of a sensing means for a line tracer system;

FIG. 8 is a schematic diagram of the positional signal indicating circuitry to be used with the sensing means of FIG. 7;

FIG. 9 is a plan view of a sensing means for use in an edge tracer system;

FIG. 10 is a schematic diagram of positional signal circuitry used with the edge following sensing means of FIG. 9; and FIG. 11 is a schematic diagram of an off edge indicating circuit to be used with the sensing means of FIG. 9.

Figures 1, 2, 3:
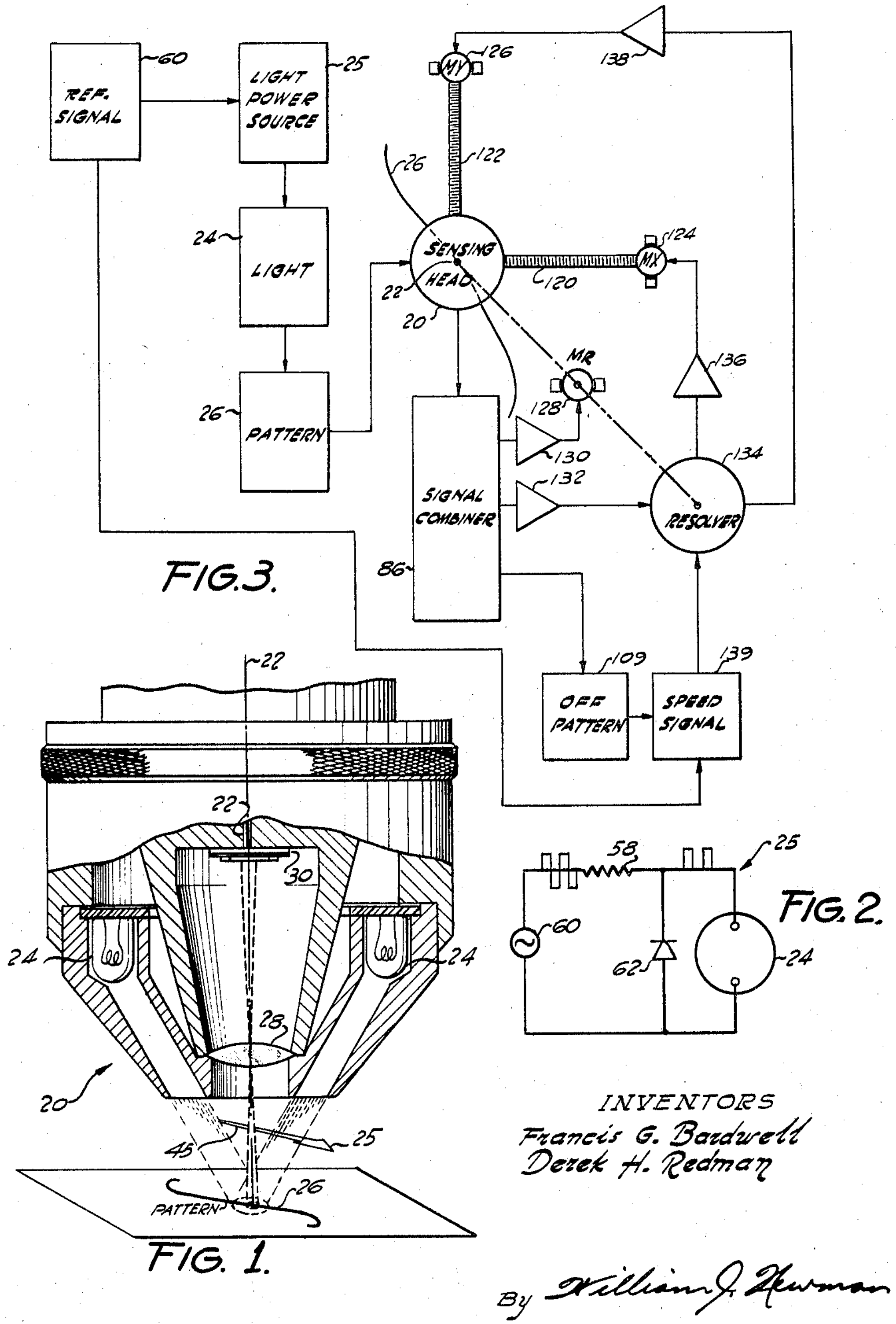
FIG. 2 is a schematic diagram of a circuit for modulating the lighting source.
FIG. 3 is a schematic block diagram of a pattern contour tracing system embodying the teachings of this invention.

Reference is made to FIG. 1 and FIG. 1*a* through FIG. 1*c* for a description of the general principles involved in this invention. FIG. 1 shows in schematic form a sensing head 20 which is rotatable about an axis 22 and movable along a pattern contour (line 26) in a direction 25 of its front-to-back axis 45. Lamps 24 are included in the sensing head 20 to illuminate the pattern contour 26 along which the sensing head is to trace. An optical system including lens 28 projects an image of the pattern contour 26 on a photosensitive device 30 which produces an electrical output dependent upon the intensity of light falling thereon. The output of the photosensitive means 30 is used to control the rotational and positional movement of the sensing head 20 with respect to the pattern contour as hereinafter described.

Figure 1A:
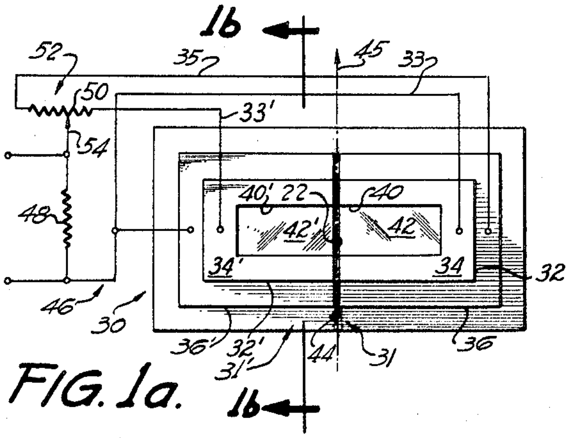
Figure 1B:
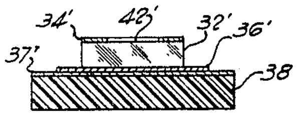
Figure 1C:
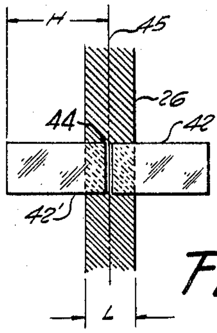

The simplest form of photosensitive means 30 comprises two photocells 31, 31' each having a photovoltaic body portion 32, 32' (FIGS. 1*a*, 1*b*). A conductor layer such as copper foils 34', 36' are solder plated to opposite surfaces of the bodies 32, 32' to form the electrodes for the cells. A base member 38 supports the assembly with an insulation layer 37, 37' between the copper foil lower electrodes 36, 36' and the base.

The upper foil 34 has a rectangular opening 40 (FIG. 1*a*) therein to expose a portion of the solar chip 32, the area being exposed hereinafter referred to as the sensitive area 42 42'. It is these areas which are subjected to the light to cause a voltage to appear across the electrodes 34, 36 and 34', 36'.

To fabricate the photosensitive means 30, a single assembly is built up on the base 38 including one large photovoltaic body such as a silicon solar chip and the copper foils which will form the electrodes. When the assembly is complete a slit 44 is cut, for example by a saw, down through the assembly and into the base 38 thus forming the two photocells 31, 31'. The sensitive areas 42, 42' are as close to equal as possible so that the voltages generated between electrodes 34, 36 and 34', 36' are substantially equal when they are subjected to equal intensity light.

The two photocells 31, 31' are electrically connected to oppose each other in a circuit 46 (FIG. 1*a*) to provide a null or zero signal across the output load resistor 48 when the two sensitive areas 42, 42' are viewing equal intensity light and to provide a positive or negative going signal dependent on which sensitive area is subjected to the greater intensity light.

The resistive element 50 of potentiometer 52 is connected between the top foil 34' of photocell 31' and the bottom foil 36 of the photocell 31. The output load resistor 48 is connected between the movable arm 54 of a balance potentiometer 52 and the common connection between the top foil 34 of photocell 31 and the bottom foil 36' of photocell 31'.

Assuming current flow to be from the bottom foils 36, 36' through the photovoltaic bodies 32, 32' to the upper foils 34, 34' for each photocell 31, 31', the current path for cell 31 extends from foil 34 through conductor 33, resistor 48, potentiometer 52 and conductor 35 to the bottom foil 36. The current from cell 31' passes from upper foil 34' through conductor 33', potentiometer 52, resistor 48 and conductor 35' to lower foil 36'. Thus, the current from the two cells 31, 31' will oppose each other through the load resistor 48.

Figure 1D:
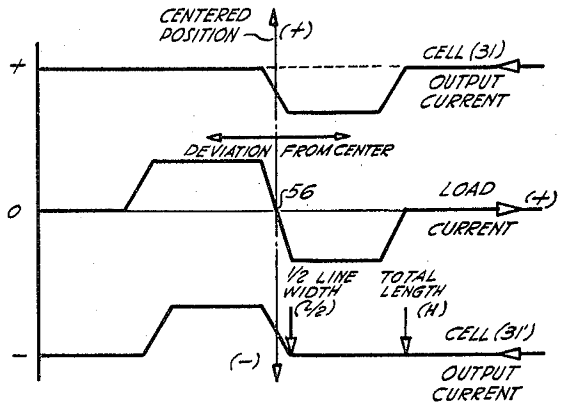

When the sensing head 20 is over a pattern line 26 illuminated by a steady light such that the photosensitive areas 42 and 42' are viewing equal portions of the image of the line, as shown in 1*c*, the voltage across output load resistor 48 is zero as indicated at the centered position 56 in the graphical representation of the load current curve in FIG. 1*d*. Each of the cells 31 and 31' are generating currents as indicated at the centered positions on the respective cell output curves of FIG. 1*b*. However, their respective current flows through the load resistor 48 are in opposite directions and cancel out. As the saw slit 44 transversely deviates from the image of the center of the line 26 in either direction, the currents generated by the respective photocells 31, 31' become unbalanced to provide a negative or positive voltage across resistor 48 dependent upon the direction of the transverse deviation. Thus, a signal is produced across the output, the sign and level of which are indicative of the direction and amount, respectively, of transverse deviation of the centerline of scan of the sensing means from the pattern contour.

It can be seen that the saw slit 44 thus defines the centerline of scan 45 which ordinarily will coincide with the front-to-back axis 45 of the scanning head 20. It is to be noted, however, that the centerline of scan need not necessarily coincide with the front-to-back axis as, for example, when mirrors are used in the optical system to project the image to a plane which is not parallel to the plane of the pattern. They also would not coincide if lateral offset is provided to compensate for the radius of a work tool or the kerf width of a gas torch. In such cases the axis of rotation 22 of the scanning head also would not coincide with the axis of rotation of the image on the photosensitive means. For the purpose of this description, however, they will be assumed to coincide.

The signals across the load resistor 48 may be used to energize a motor for revolving the sensing head 20 about the axis of rotation 22. As may be seen, the sensitive areas 42, 42' are located forward of the axis 22 to provide steering sense in a well known manner. The motor may be used to steer a tracing wheel on the rotor of a resolver in a coordinate drive tracing system in a well known manner to cause the sensing head 20 to follow the line.

The photosensitive device 30 may also be used to provide a phase and amplitude sensitive alternating current output from the photosensitive means circuit 46. To accomplish this the device 30 and circuit remain the same, but the lamps 24 for illuminating the pattern are modulated to flash on and off at a predetermined fundamental frequency by a circuit 25 such as shown in FIG. 2. One or more fast acting neon bulbs of a well known type may be used, connected in series with a resistor 58 across an AC source 60. A square wave signal is preferred but it is to be understood that any desired waveform may be used. A diode 62 shunts the light 24 so that it flashes at the same frequency as the signal from the AC source 60. The currents generated by the photocells 31, 31' will, therefore, be oppositely directed pulsating DC currents, and the signal across the load resistor 48 will have a fundamental AC voltage component, the phase and amplitude of which are indicative of the direction and amount of transverse deviation of the centerline of scan 45 from the center of the image of the pattern line 26. If the center of scan 45 is centered on the line as in FIG. 1*c* the current pulsations caused by the flickering light will cancel out in the resistor 48. If, however, the center of scan 45 drifts off of the edge of the line the photocell 31 or 31' having the smallest portion of the line 26 cast thereon will produce greater amplitude pulsations than the other. A signal of the light flickering frequency is therefore provided across the load resistor 48, and its phase will be determined by the position of the image of the line with respect to the photocells 31, 31'.

The principles hereinbefore described may be utilized in a more complex and sophisticated photosensitive means 64 (FIG. 4) which are used to provide signals indicative not only of the amount and direction of transverse deviation, but also the direction and amount of angular deviation of the centerline of scan 45 from the image of the pattern line 26.

The photosensitive means 64 comprise a first pair of photovoltaic cells 68, 68' and a second pair 70, 70' which pairs make up the means for deriving the angular and transverse deviation signals. The cells 72, 72' and 74, 74' are used for providing an alarm signal when the sensing head strays completely off the pattern line as will be later described.

The photosensitive means 64 are fabricated from a single photovoltaic body 32 such as a solar cell chip 32 with copper foils 34, 36 on either surface (FIG. *4a*) and mounted on a single base 38 in substantially the same manner as described for FIG. *1b*. Saw cuts 78 through the copper foils and silicon solar chip to delineate the separate cells 68, 68', 70, 70', 72, 72', 74, 74'. The sensitive areas 80, 80', 82, 82', all have substantially equal areas so that they will produce substantially equal outputs when subjected to equal light intensities. The copper foil segments 84, 84', and 86, 86' on the upper surfaces of the silicon chip segments form one electrode for each of the cells 68, 68', 70, 70', and the lower copper foil segments 85, 85', 87, 87' form the other electrodes.

The photocells of each pair 68, 68' and 70, 70' are located adjacent each other on either side of the centerline of scan 45 and the two pairs of cells are located along the centerline of scan equidistant in front of and behind the center of rotation 22 of the sensing head 20.

With the above configuration of the photocells, it may be seen that they will all have equal outputs when the centerline of scan 45 is aligned with the image of the pattern line 26. Thus, with the circuit connection between the cells of each pair as discussed for FIG. *1a*, the algebraic difference of the outputs of the first pair of cells 68 and 68' will be zero as will the algebraic difference of the outputs of the second pair 70 and 70'.

If, however, the image of the pattern line 26 is to the right of the centerline of scan 45 as shown by broken line 81, the outputs of cells 68' and 70' will be substantially less than the outputs of cells 68 and 70. Thus, an algebraic subtraction of the signal outputs of cells 68 and 68' will no longer be zero and likewise for cells 70 and 70'. The difference signal of pair 68, 68' will be equal to the difference signal of pair 70, 70', however, and an algebraic subtraction thereof would be zero, indicating no angular deviation between the centerline of scan 45 and the pattern line image. The algebraic sum of the two pairs of difference signals is indicative of the transverse deviation of the centerline of scan 45 from the image of the pattern line.

Assuming now the condition where the centerline of scan 45 is angularly displaced with respect to the pattern line image 26 and passing through the axis of rotation 22, as shown by broken line 83, the image is cast only on photocells 68 and 70'. The algebraic difference between pair of cells 68 and 68' will be essentially equal but opposite to the algebraic difference between pair of cells 70 and 70'. Thus, the algebraic subtraction of these two difference signals will not be zero but will provide a resultant signal, the phase and amplitude of which are indicative of the direction and amount of angular deviation of the centerline of scan 45 from the pattern line image 26. In this case the algebraic addition of the difference signals will produce a zero signal indicating that there is not transverse deviation of the line from the center of scan.

The signal combiner circuit 86, shown in FIG. 5, is a preferred but not sole means for combining the signals in accordance with the foregoing description to provide angular and transverse deviation signals in a system using a pulsating light source to illuminate the line. The photocells 68, 68', 70, 70' are shown as diodes because they are unidirectional current generating devices.

The photocells 68, 68' are connected in the circuit to provide an algebraic difference signal of their outputs at the wiper 88 of a balancer potentiometer 90 and across potentiometer 100 by reverse connecting the first pair of photocells 68, 68' between the ends of the resistive element 92 of potentiometer 90 and ground line 94. As may be seen by the waveforms 96, 96' in FIG. 5 for the condition when the centerline of scan 45 is aligned with the image of pattern line 26, the pulsating currents generated by the two photocells due to the flickering lights cancel each other to provide zero output at the potentiometer wiper 88. The output across resistive element 98 of potentiometer 100 is, therefore, also zero.

The photocells 70, 70' are connected in the same manner to provide a difference signal across the fixed resistor 102. The waveforms 104, 104' indicate that the difference signal across resistor 102 will be zero for the aligned condition.

The difference signals from the respective photocell pairs 68, 68' and 70, 70' are algebraically added in the primary circuit of transformer 106 to provide a resultant sum signal at terminals 108. The phase and amplitude of this resultant sum signal is indicative of the direction and amount of transverse displacement of the centerline of scan from the image of the pattern line. The secondary circuit of the transformer 106 algebraically subtracts the difference signals of the two pairs of photocells appearing across resistors 98 and 102, respectively, to provide a resultant difference signal at terminals 110. The phase and amplitude of this resultant difference signal are indicative of the direction and amount of angular deviation of the centerline of scan 45 from the image of the pattern line 26.

As previously mentioned, the photocells 72, 72' and 74, 74' can detect if the sensing head strays off the pattern line. FIG. 6 shows how these photocells may be connected to give a warning signal when the sensing head strays off of the line. The photocells 72, 72' are connected in additive manner with respect to each other as are photocells 74, 74', but the latter pair are reverse connected from the first pair so that the signal across load resistor 110 is the algebraic difference between the sum signals of the respective photocell pairs 74, 74' and 72, 72'. These photocells are also constructed with their respective sensitive areas 112, 112' and 114, 114' of equal size. Thus, when the image of the pattern line 26 is cast on one or both of the photocells 72, 72', their combined output will be substantially less than the combined output of the photocells 74, 74' so that a signal will appear across load resistor 110.

If, however, the sensing head drifts so that the pattern line image 26 falls on one or the other of the outer photocells 74, 74' the combined outputs of these transistors will drop and the combined output of photocells 72, 72' will increase causing a 180° phase shift to occur across load resistor 110. This phase shift, or the null which occurs during this phase transformation, may be used to energize an alarm to indicate the advance of the sensing head off the pattern line.

A complete system for utilizing the teachings hereinabove to trace along a pattern line is shown in the block diagram of FIG. 3. The system shown is a well known coordinate drive type in which the sensing head 20 is positionally translated along the coordinate system X and Y directions by lead screws 120 and 122, respectively, which are rotated by the X and Y motors 124 and 126, respectively. Another motor 128 is geared to the sensing head 20 to rotate it about its axis of rotation 22.

The sensing head 20 views the pattern contour 26, the illumination of which is modulated by light power source 25 in accordance with the frequency of the reference signal source 60, and produces an output to the signal combiner 86. The signal combiner 86 provides a rotational signal through amplifier 130 to the rotation motor 128 to turn the sensing head in accordance with the direction of the pattern contour. The transverse displacement signal is conducted from the signal combiner 86 through amplifier 132 to the transverse winding (not shown) of a resolver 134, the output of which is fed through amplifiers 136 and 138, respectively, to the X and Y motors 124, 126. A speed signal is provided to the speed winding (not shown) of the resolver 134 through a speed signal circuit 139 from the reference signal source 60 to drive the sensing head along a forward direction. The speed circuit may contain the offline circuit 109 to cut the speed signals to the resolver when the sensing head strays off the pattern. The rotational motor 128 which rotates the sensing head 20 also rotates a rotor (not shown) within the resolver to provide the proper relationship between the incoming signals from the signal combiner 86 and speed signal source 139 in a well known manner.

A servo loop coordinate drive system is thereby provided, utilizing the unique modulated light scanning techniques hereinbefore described. It is to be understood that this system is also applicable to an alternate line sensing technique and an edge sensing technique to be described hereinafter.

Referring now to the alternate embodiment of the line tracing technique, reference is made to FIGS. 7 and 8. The photosensitive means 64*a* of this embodiment comprises a first pair of photocells 140, 140′ and a second pair of photocells 142, 142′ arranged in a substantially rectangular configuration with the demarcation between cells 140, 142 and cells 140′ and 142′ defining the centerline of scan 45. The photocells 140, 140′ have their sensitive areas 144, 144′ located forward of the axis of image rotation 22*a* while the sensitive areas 146, 146′ of photocells 142, 142′ are located adjacent each other at the axis of image rotation 22.

In the combiner circuit 86 for this embodiment shown in FIG. 8, the photocells 144 and 144′ are connected in an algebraically subtracting configuration so that the signal appearing across potentiometer 150 is the difference between their outputs. The photocells 146, 146′ are also connected in an algebraically subtracting relationship to provide a difference signal across resistor 152 and at the terminals 154. The phase and amplitude of the difference signal at terminals 154 is indicative of the direction and amount of transverse deviation of the centerline of scan 45 from the image of the pattern line directly, in the same manner as decsribed in the simple case of FIG. 1*b*.

The signals at the potentiometer 150 and across resistor 152 which are the difference signals of the respective photocell pairs 144, 144′ and 146, 146′ are algebraically added and the resultant sum signal appears at the terminals 156 between the center tap of inductance 158 and the ground conductor 160. The signals at the terminals 156 and 154 may be provided to the rotational motor 128 and the resolver 134 in the system of FIG. 3 to rotate and positionally translate the sensing head 20 with respect to the pattern line. A phase reversal of the rotational signal at terminals 156 is required to provide the proper direction by well known means not shown. An offline set of photocells and circuit therefor, as shown in FIGS. 4 and 6, may be provided if desired.

The modulated light scanning techniques may also be used to trace along a contour formed by an edge 166 (FIG. 9) between two contrasting colors on a pattern. The photosensitive means 168 of the edge tracer comprises a first pair of photocells 170, 170′ having photosensitive areas 172 and 172′, respectively, which are positioned parallel to one another and transverse to the image of the edge 166 when the sensing head is aligned with the contour edge. The geometric centers of the two sensitive areas 172, 172′ determines the center of scan 45 which corresponds with the front-to-back axis as described for the first embodiment. The sensitive areas 172 and 172′ are located substantially equi-distant forward and behind the center of image rotation 22.

There is a second pair of photocells 176, 176′ having sensitive areas 178, 178′ adjacent either side of the sensitive areas 172, 172′ of the first pair of photocells. The geometric area of all of the sensitive areas are substantially equal so that the photocells will all produce substantially equal signals when subjected to equal light intensities.

The signals from the photocells are combined in the signal combiner 86, shown in FIG. 10, to derive the angular and transverse displacement signals. The photocells 170, 170′ of the first pair are connected in an algebraically adding manner to the primary 180 of transformer 182 to provide a sum signal at the center tap 184. The algebraic difference of the outputs of cells 170, 170′ is found at terminals 186 across the secondary 188 of the transformer 182. The phase and amplitude of the signal at terminals 186 is indicative of the direction and amount of angular deviation of the centerline of scan 45 from the image of the edge 166. The sum signal of the outputs of photocells 170 170′ at primary center tap 184 is compared with the sum of the outputs of photocells 176, 176′ across the primary 190 of transformer 192. The difference of these two sum signals appears across the secondary 194 at terminals 196 and has a phase and amplitude which are indicative of the direction and amount, respectively, of transverse displacement of the centerline of scan 45 from the image of the pattern edge 166. The angular deviation signal at terminals 186 and the displacement deviation signal at terminals 196 may be provided to the rotational motor 128 and the resolver 134, respectively, of the system in FIG. 3 to rotate and positionally translate the sensing head 20 to follow along the pattern edge.

If an edge tracer system in which only a rotational drive is required, such as in a tracing wheel or simple coordinate drive system, the photocell 170′ may be eliminated and the circuit of FIG. 10 modified by connecting the photocell 170 directly to the primary 190 of transformer 192 as shown by the dotted line connection 193. The output across terminals 196 is used to drive a steering motor in the well known manner.

The photocells 198 and 198′ are utilized for indicating if the photosensing means 168 strays away from the pattern edge. The outputs of the photocells 198, 198′ are algebraically subtracted across potentiometer 199 in the off pattern circuit 109 shown in FIG. 11 and the resultant difference signal appears across load resistor 200. When the scanner is aligned with the pattern edge shown in FIG. 9, the photocell 198 will have little or no output since it is viewing the dark portion of the contour pattern while the photocell 198 will have a fluctuating output in view of the fluctuating light reflected from the light portion of the pattern. An output, therefore, appears across the resistor 200. If the pattern shifts with respect to the photosensitive means 168 so that both sensitive photocells 198 and 198′ are viewing the black portion, neither cell will provide an output and there will be no signal across the resistor 200. On the other hand, if photocells 198, 198′ are both viewing only the white portion of the pattern, they will both be generating an output, but their algebraic difference is again zero with no signal appearing across the resistor 200. Therefore, the presence of signal across resistor 200 indicates that the sensing means 168 is scanning the pattern edge image whereas absence of a signal thereacross indicates the scanner has strayed off the pattern edge.

While there have been several preferred embodiments described in the specification and shown in the drawings, it is understood that many modifications and additions may be made thereto without departing from the invention. It is, therefore, intended to be bound only by the scope of the appended claims.

What is claimed is:

1. Pattern tracing equipment comprising a sensing head including first and second photosensitive means defining a reference line in the head, the two photosensitive means being arranged to produce equal electrical outputs when subjected to equal illumination, means for projecting images of different parts of an optical field on each of the photosensitive means, a pulsating light source arranged to illuminate the field, a combining circuit arranged to derive from the outputs of the photosensitive means a resultant signal whose amplitude and phase are representative of the amount and direction respectively of deviation between the reference line and a pattern indicia in the optical field.

2. Equipment as claimed in claim 1 for tracing a pattern line in which the first photosensitive means comprises a pair of photocells positioned adjacent each other on either side of the reference line and forward of the axis of image rotation and said combiner circuit comprises means for algebraically subtracting the outputs of the pair of cells to provide a first difference signal.

3. Equipment as claimed in claim 2 in which the second photosensitive means comprises a second pair of photocells positioned adjacent each other on either side of the reference line and behind the axis of image rotation and said combiner circuit comprises means for algebraically subtracting the outputs of said second pair of cells to provide a second difference signal, means for algebraically subtracting said difference signals to provide a resultant which is representative of the angular deviation of the reference line with respect to the image of the indicia, and means for algebraically adding the difference signals to produce a resultant which is representative of the transverse deviation of the reference line from the image of the indicia.

4. Equipment as claimed in claim 2 in which the second photosensitive means comprises a second pair of photocells positioned adjacent each other on either side of the reference line in line with the axis of image rotation and said combiner circuit comprises means for algebraically subtracting the output of said second pair of cells to provide a second difference signal representative of the transverse deviation of the reference line from the image of the indicia, and means for adding the two difference signals to produce a resultant which is representative of the angular deviation of the reference line with respect to the image of the indicia.

5. Equipment as claimed in claim 3 comprising a third pair of photosensitive cells positioned adjacent each other on either side of the reference line, a fourth pair of photosensitive cells adjacent either side of the third pair of cells, means for adding the output of said third pair of cells, adding the output of said fourth pair of cells, and providing a signal responsive to the difference between the two sums representative of the presence or absence of an image of said pattern line on any one of the third and fourth pair of cells.

6. Equipment as claimed in claim 1 for tracing along a pattern edge in which the first and second photosensitive means comprise a pair of photocells positioned parallel with one another transverse to and spaced apart along the reference line, and said combiner circuit comprises means for algebraically subtracting the outputs from said cells to produce a resultant representative of the angular deviation of the reference line with respect to the edge image.

7. Equipment as claimed in claim 6 comprising a further pair of photosensitive cells positioned adjacent either side of said first pair of cells, and said combiner circuit comprises means for algebraically adding the output of said first pair of cells to provide a first sum signal, means for algebraically adding the outputs of the further pair of cells to provide a second sum signal and means for algebraically subtracting said sum signals to produce a resultant representative of the transverse deviation of the reference line with respect to the edge image.

8. Equipment as claimed in claim 1 in which the photosensitive means comprise photovoltaic cells.

9. Equipment as claimed in claim 3 comprising means operable responsive to said transverse deviation resultant signal for turning said head to align said reference line with said pattern line and means operable responsive to said transverse deviation signal for driving said head towards and along said pattern line.

10. Equipment as claimed in claim 4 comprising means operable responsive to said transverse deviation resultant signal for turning said head to align said reference line with said pattern line and means operable responsive to said transverse deviation signal for driving said head towards and along said pattern line.

11. Equipment as claimed in claim 7 comprising means operable responsive to said transverse deviation resultant signal for turning said head to align said reference line with said pattern edge and means operable responsive to said transverse deviation signal for driving said head towards and along said pattern edge.

12. In line tracing equipment having means for sensing an image of the line, said sensing means defining a reference line, apparatus for sensing when the line sensing apparatus strays off of the image of the line comprising first photosensitive means having a sensitive area extending across said reference line, a pair of second photosensitive means adjacent either side of said photosensitive means, first means for algebraically combining the outputs of said pair of second photosensitive means, and second means for algebraically combining the output of said first photosensitive means with the combined output of said second photosensitive means for providing a signal representative of the presence or absence of an image of said pattern line on said photosensitive means.

13. In the equipment of claim 12 wherein said first combining means algebraically adds the output of said pair of second photosensitive means, and wherein said second combining means is a subtracton circuit whereby a phase reversal in the output signal of said subtraction signal indicates the departure of said sensing means from the image of said line.

14. Equipment as claimed in claim 4 comprising a third pair of photosensitive cells positioned adjacent each other on either side of the reference line, a fourth pair of photosensitive cells adjacent either side of the third pair of cells, means for adding the output of said third pair of cells, adding the output of said fourth pair of cells, and providing a signal responsive to the difference between the two sums representative of the presence or absence of an image of said pattern line on any one of the third and fourth pair of cells.

15. Equipment as claimed in claim 1 including coordinate drive positioning means for the sensing head comprising a pair of alternating current motors, one for each of two coordinates, a third alternating current motor for rotating the sensing head, and a resolver rotatable by said third motor for providing component signals to said pair of alternating current coordinate motors.

References Cited

UNITED STATES PATENTS

| | | | |
|---|---|---|---|
| 3,159,778 | 12/1964 | Gavreau et al. | 250—202 X |
| 3,234,843 | 2/1966 | Killpatrick | 250—202 X |
| 3,286,142 | 11/1966 | Redman | 250—202 X |
| 3,297,879 | 1/1967 | Meyer | 250—202 X |
| 3,335,287 | 8/1967 | Hargens | 250—202 X |

JAMES W. LAWRENCE, *Primary Examiner.*

C. R. CAMPBELL, *Assistant Examiner.*

U.S. Cl. X.R.

250—208, 220; 313—94; 318—18; 338—17